(12) United States Patent  
Makino et al.

(10) Patent No.: US 8,158,553 B2
(45) Date of Patent: Apr. 17, 2012

(54) PHOTOCATALYST DISPERSION ELEMENT, METHOD FOR PRODUCING PHOTOCATALYST DISPERSION ELEMENT, PHOTOCATALYST BODY, AND METHOD FOR PRODUCING PHOTOCATALYST BODY

(75) Inventors: Nobuaki Makino, Kanagawa-ken (JP); Junsei Yamabe, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/731,777

(22) Filed: Mar. 25, 2010

(65) Prior Publication Data

US 2010/0248948 A1 Sep. 30, 2010

(30) Foreign Application Priority Data

Mar. 31, 2009 (JP) ................................. 2009-086799

(51) Int. Cl.
*B01J 21/00* (2006.01)
*B01J 23/00* (2006.01)
(52) U.S. Cl. ........ 502/305; 502/254; 502/300; 502/306; 502/317
(58) Field of Classification Search .................. 502/254, 502/300, 305, 306, 317
See application file for complete search history.

(56) References Cited

U.S. PATENT DOCUMENTS

| 5,905,109 | A | * | 5/1999 | Shimizu et al. | 524/506 |
| 7,659,226 | B2 | * | 2/2010 | Tucker, II | 502/300 |
| 7,799,728 | B2 | * | 9/2010 | Yamabe et al. | 502/305 |
| 2009/0253575 | A1 | * | 10/2009 | Yamabe et al. | 502/305 |
| 2009/0305879 | A1 | * | 12/2009 | Sakatani et al. | 502/210 |
| 2010/0190633 | A1 | * | 7/2010 | Bai et al. | 502/63 |

FOREIGN PATENT DOCUMENTS

| JP | 5-502035 | 4/1993 |
| JP | 10-147771 | 6/1998 |
| JP | 11-1620 | 1/1999 |
| JP | 2917525 | 4/1999 |
| JP | 2002-212464 | 7/2002 |
| JP | 2007-260480 | 10/2007 |
| JP | 2007-268523 | 10/2007 |
| JP | 2008-230878 | 10/2008 |
| JP | 2008-307877 | 12/2008 |
| JP | 2009-56348 | 3/2009 |
| WO | WO97/23572 | 7/1997 |

OTHER PUBLICATIONS

Office Action issued Sep. 1, 2011 in Japanese Patent Application No. 2011-153038 (with English translation).

Japanese Office Action issued Aug. 2, 2011, in Patent Application No. 2009-086799 (with English-language translation).

* cited by examiner

*Primary Examiner* — Patricia L Hailey

(74) *Attorney, Agent, or Firm* — Oblon, Spivak, McClelland, Maier & Neustadt, L.L.P.

(57) ABSTRACT

A photocatalyst dispersion element includes: a photocatalytic material; a solvent; and an ion additive. The ion additive generates a cation having a smaller ion radius than a tetramethylammonium ion in the solvent.

16 Claims, 3 Drawing Sheets

PHOTOCATALYST DISPERSION ELEMENT, METHOD FOR PRODUCING PHOTOCATALYST DISPERSION ELEMENT, PHOTOCATALYST BODY, AND METHOD FOR PRODUCING PHOTOCATALYST BODY

CROSS-REFERENCE TO RELATED APPLICATIONS

This application is based upon and claims the benefit of priority from the prior Japanese Patent Application No. 2009-086799, filed on Mar. 31, 2009; the entire contents of which are incorporated herein by reference.

BACKGROUND

1. Field

This disclosure relates to a photocatalyst dispersion element, a method for producing a photocatalyst dispersion element, a photocatalyst body, and a method for producing a photocatalyst body.

2. Background

Photocatalytic materials such as titanium dioxide have recently been drawing attention. A "photocatalytic material" is a substance having semiconductor-like properties, which is brought into an excited state and generates electron-hole pairs upon irradiation with light having an energy higher than the band gap energy between its conduction band and valence band.

For titanium dioxide, photoexcitation occurs upon irradiation with light having a wavelength of 387 nm or less, and electron-hole pairs are generated therein. Then, the electron-hole pair generates active oxygen species such as hydroxyl radicals and superoxide ions at the surface of the photocatalytic material and its neighborhood, and the oxidizing power of these active oxygen species leads to decomposition activity and hydrophilization. These actions can be used to achieve a self-cleaning effect, deodorizing effect, antibacterial effect and the like. Hence, various parts and products provided with photocatalytic materials have been proposed.

Here, in the case of titanium dioxide, which is a typical photocatalytic material, the main excitation light is ultraviolet radiation, causing the problem of failing to achieve sufficient performance indoors, where there is little ultraviolet radiation. Thus, investigation has been made on so-called visible light-responsive photocatalytic materials, such as tungsten oxide and cadmium sulfide.

When such a photocatalytic material is used in various parts and products, the photocatalytic material needs to be provided on a substrate surface. In such cases, conveniently, a liquid containing the photocatalytic material can be produced in advance and adhered to the substrate surface.

To this end, liquids and creams containing photocatalytic materials have been proposed (see JP-A-11-001620 (1999) and JP-A-2002-212464). In producing such a liquid or cream containing a photocatalytic material, the hydrogen ion exponent is often adjusted for the convenience of production.

However, the adjustment of the hydrogen ion exponent has been limited to the production process, and no consideration has been given to the effect that the hydrogen ion exponent of the produced liquid or cream itself exerts on the catalytic activity of the photocatalyst formed by adhering the photocatalyst dispersion element to the surface of the substrate.

Furthermore, no consideration has been given also to the effect that the concentration of the additive contained in the produced liquid or cream exerts on the catalytic activity of the photocatalyst formed by adhering the photocatalyst dispersion element to the surface of the substrate.

Moreover, no consideration has been given also to the effect that the main ingredient of the additive exerts on the catalytic activity of the photocatalyst formed by adhering the photocatalyst dispersion element to the surface of the substrate.

Thus, there has been a danger of decreasing the catalytic activity of the photocatalyst formed by adhering the photocatalyst dispersion element to the surface of the substrate.

SUMMARY

According to an aspect of the invention, there is provided a photocatalyst dispersion element including: a photocatalytic material; a solvent; and an ion additive, the ion additive generating a cation having a smaller ion radius than a tetramethylammonium ion in the solvent.

According to another aspect of the invention, there is provided a method for producing a photocatalyst dispersion element, including: adjusting hydrogen ion exponent of a solvent so as to fall in a range of suppressing decrease of catalytic activity of a photocatalyst to be formed; and mixing a photocatalytic material in the solvent.

According to another aspect of the invention, there is provided a photocatalyst body including: a substrate; and a photocatalyst formed by adhering a photocatalyst dispersion element to a surface of the substrate and drying the photocatalyst dispersion element, the photocatalyst dispersion element including: a photocatalytic material; a solvent; and an ion additive, the ion additive generating a cation having a smaller ion radius than a tetramethylammonium ion in the solvent.

According to another aspect of the invention, there is provided a method for producing a photocatalyst body, including: adhering a photocatalyst dispersion element to a surface of a substrate, the photocatalyst dispersion element including: a photocatalytic material; a solvent; and an ion additive, the ion additive generating a cation having a smaller ion radius than a tetramethylammonium ion in the solvent.

DETAILED DESCRIPTION

Embodiments of the invention will now be illustrated.

In the embodiments, the photocatalyst dispersion element is assumed to be such that a photocatalytic material is dispersed in a flowable substance serving as a solvent. Here, the flowable substance includes not only a liquid substance but also a so-called gel-like substance.

In general, a metal oxide particle in an alkaline aqueous solution undergoes substitution with hydroxy groups (—OH) at its surface, which increases the absolute value of the zeta potential and improves its dispersibility. Hence, in a photocatalyst dispersion element with a photocatalytic material dispersed in an alkaline aqueous solution or the like, aggregation of the photocatalytic material can be suppressed, and uniformity of dispersion can be improved.

However, in accordance with the findings obtained by the inventors, it was found that an excessively high alkali concentration in the photocatalyst dispersion element (i.e., an excessively high hydrogen ion exponent) results in decreasing the catalytic activity of the photocatalyst formed by adhering the photocatalyst dispersion element to the surface of the substrate. Furthermore, it was also found that the catalytic activity of the photocatalyst significantly decreases depending on the additive added to adjust the hydrogen ion exponent of the photocatalyst dispersion element.

Thus, when a photocatalytic material is dispersed in a flowable substance serving as a solvent to form a photocatalyst dispersion element, the upper limit of the hydrogen ion exponent of the photocatalyst dispersion element can be determined from the viewpoint of suppressing the decrease of the catalytic activity of the formed photocatalyst. In this case, it is preferable to also consider the main ingredient of the additive added to adjust the hydrogen ion exponent of the photocatalyst dispersion element.

Here, examples of the photocatalytic material easily soluble in an alkaline aqueous solution include tungsten oxide. Thus, in the following embodiments, by way of example, a description is given of the case where tungsten oxide is used as a photocatalytic material and dispersed in a flowable substance serving as a solvent.

In general, what is called tungsten oxide is tungsten trioxide ($WO_3$), which is a metal oxide extremely stable in air. Tungsten oxide has a band gap of 2.5 eV, which enables use of visible light to 480 nm. Hence, it is useful as a photocatalytic material used for indoor applications. Furthermore, tungsten oxide is relatively easily available as an industrial material, and is also a less hazardous and relatively cost-effective material.

Figure 1:
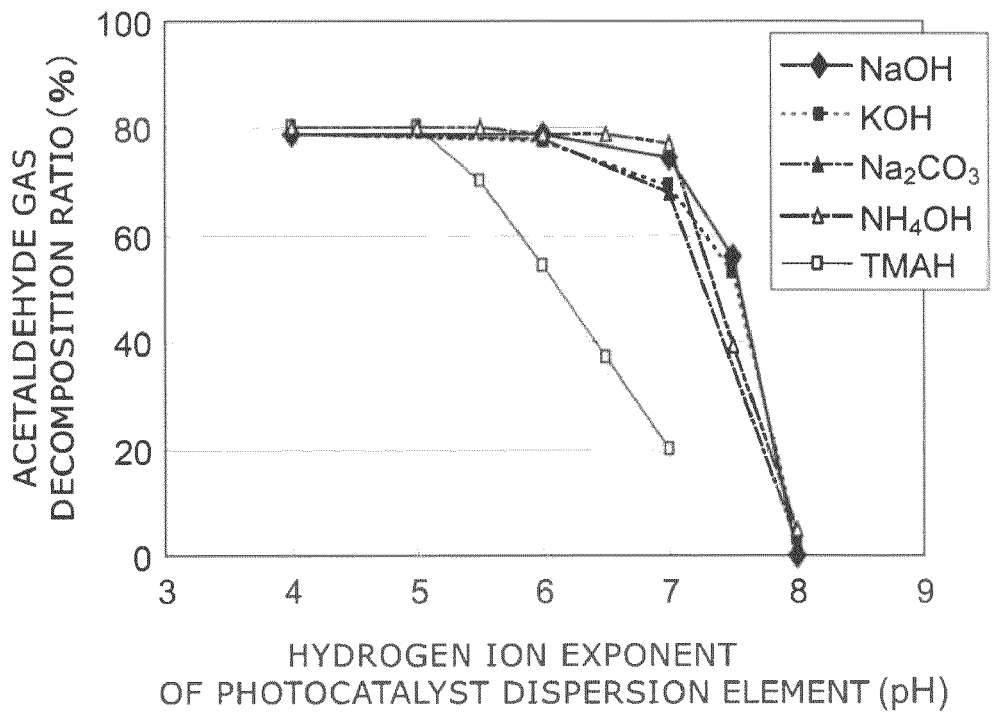
FIG. 1 is a graph for illustrating the decomposition characteristics of acetaldehyde gas.

FIG. 1 is a graph for illustrating the decomposition characteristics of acetaldehyde gas.

Figure 2:
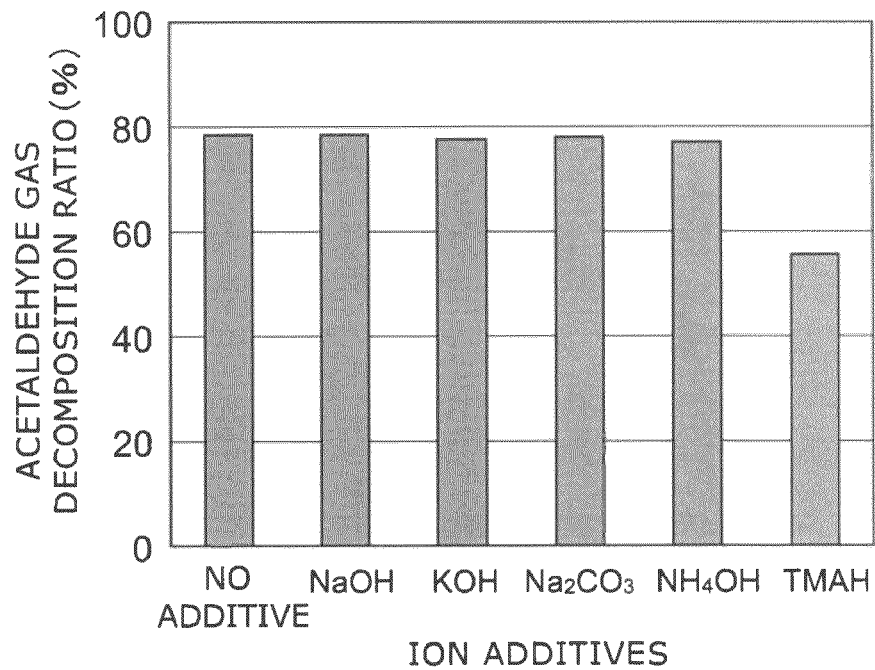
FIG. 2 is a graph for illustrating the decomposition characteristics of acetaldehyde gas for the photocatalyst dispersion element with hydrogen ion exponent pH 6.

FIG. 2 is a graph for illustrating the decomposition characteristics of acetaldehyde gas for the photocatalyst dispersion element with hydrogen ion exponent pH 6.

Here, FIGS. 1 and 2 are graphs for illustrating the characteristics for the case where the photocatalyst dispersion element is adhered to a substrate surface and dried to form a photocatalyst, which is irradiated with visible light to decompose acetaldehyde gas.

In this case, the flowable substance as a solvent is water, and the photocatalytic material is tungsten oxide ($WO_3$). The added amount of tungsten oxide ($WO_3$) in 20 gw of water is 10 wt %. As an ion additive, sodium hydroxide (NaOH), potassium hydroxide (KOH), sodium carbonate ($Na_2CO_3$), ammonium hydroxide ($NH_4OH$), and tetramethylammonium hydroxide (TMAH) are used.

The vertical axis of FIG. 1 represents acetaldehyde gas decomposition ratio (%), and the horizontal axis represents the hydrogen ion exponent of the photocatalyst dispersion element (solvent). The vertical axis of FIG. 2 represents acetaldehyde gas decomposition ratio (%), and the horizontal axis represents ion additives.

In accordance with the findings obtained by the inventors, the catalytic activity can be increased by coupling the metallic element (tungsten (W) in this embodiment) of the photocatalytic material in the photocatalyst with a hydroxy group (—OH). To this end, it is useful to add an ion additive for adjusting the hydrogen ion exponent of the photocatalyst dispersion element to the alkaline side. However, it was found that use of an ion additive composed primarily of an organic alkali (such as tetramethylammonium hydroxide (TMAH)), which generates ions having a large ion radius, decreases the number of couplings between the metallic element of the photocatalytic material and the hydroxy group (—OH).

Figure 3:
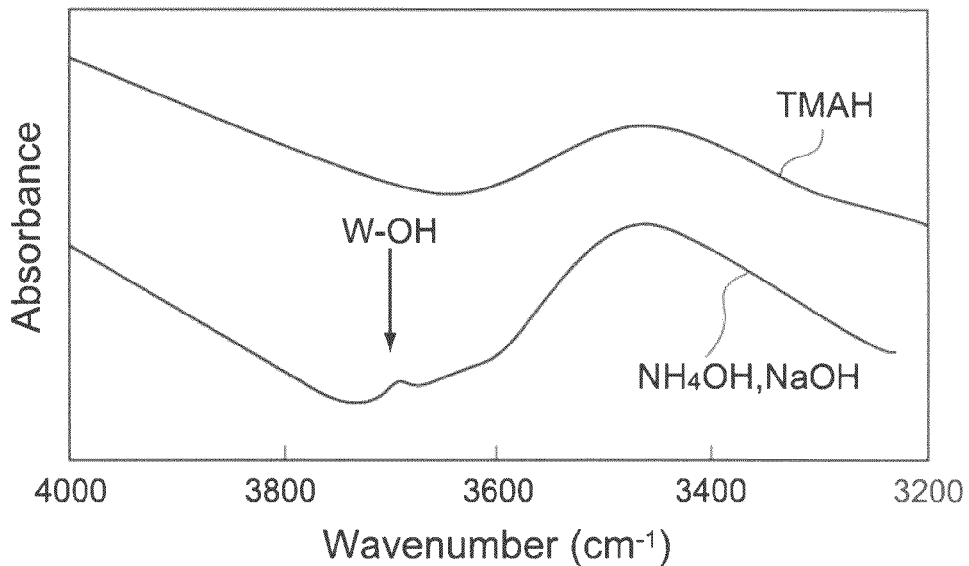
FIG. 3 is a graph for illustrating the effect of the main ingredient of the ion additive on the coupling between the metallic element and the hydroxy group.

FIG. 3 is a graph for illustrating the effect of the main ingredient of the ion additive on the coupling between the metallic element and the hydroxy group (—OH).

Here, FIG. 3 is obtained by Fourier transform infrared (FT-IR) spectroscopic measurement on the coupling between tungsten (W) and the hydroxy group (—OH) in a photocatalyst formed by adhering the photocatalyst dispersion element to a substrate surface and drying it. In this case, the hydrogen ion exponent of the photocatalyst dispersion element is pH 6. As an ion additive, sodium hydroxide (NaOH), ammonium hydroxide ($NH_4OH$), and tetramethylammonium hydroxide (TMAH) are used.

As shown in FIG. 3, when sodium hydroxide (NaOH) or ammonium hydroxide ($NH_4OH$) is used as an ion additive, the coupling (W—OH) between tungsten (W) and the hydroxy group (—OH) can be clearly identified. However, when tetramethylammonium hydroxide (TMAH) is used as an ion additive, the coupling (W—OH) between tungsten (W) and the hydroxy group (—OH) cannot be clearly identified.

Hence, when an organic alkali or the like, which generates ions having a large ion radius, is used as an ion additive, the catalytic activity of the formed photocatalyst may decrease.

For instance, as shown in FIGS. 1 and 2, if tetramethylammonium hydroxide (TMAH), which is an organic alkali, is used as an ion additive, the acetaldehyde gas decomposition ratio significantly decreases even when the photocatalyst dispersion element is neutral (pH 7). This means a significant decrease in the catalytic activity of the formed photocatalyst. Thus, to keep the acetaldehyde gas decomposition ratio at 50% or more, the hydrogen ion exponent of the photocatalyst dispersion element needs to be pH 6 or less. Consequently, it is difficult to keep the photocatalyst dispersion element neutral, which may restrict the material and the like of the substrate to which the photocatalyst dispersion element is adhered.

On the other hand, an inorganic alkali, which generates ions having a small ion radius, can suppress the effect on the coupling between the metallic element and the hydroxy group (—OH). Hence, it is preferable to use an ion additive composed primarily of an inorganic alkali. Such an ion additive can illustratively be one capable of generating alkali metal ions, alkaline earth metal ions, and ammonium ions. For instance, it can be an ion additive composed primarily of sodium hydroxide (NaOH), potassium hydroxide (KOH), sodium carbonate ($Na_2CO_3$), or ammonium hydroxide ($NH_4OH$) described above. However, the ion additive is not limited thereto, but any ion additive may be used as long as cations having a smaller ion radius than at least the tetramethylammonium ion ($TMA^+$) are generated in a flowable substance (in a solvent).

As shown in FIG. 1, in the case of using an ion additive composed primarily of an inorganic alkali such as sodium hydroxide (NaOH), a high acetaldehyde gas decomposition ratio can be achieved even when the photocatalyst dispersion element is neutral (pH 7). This can relax restrictions on the material and the like of the substrate to which the photocatalyst dispersion element is adhered, and hence the versatility can be significantly improved.

Here, as shown in FIG. 1, even in the case of using an inorganic alkali such as sodium hydroxide (NaOH), when the hydrogen ion exponent is too high, the catalytic activity of the formed photocatalyst contrarily decreases.

Thus, even in the case of using an ion additive composed primarily of an inorganic alkali such as sodium hydroxide (NaOH), it is preferable that the hydrogen ion exponent of the photocatalyst dispersion element (solvent) be pH 7.5 or less. That is, it is preferable that the hydrogen ion exponent of the photocatalyst dispersion element (solvent) is set to pH 7.5 or less by containing the ion additive. Then, an acetaldehyde gas decomposition ratio of approximately 50% or more can be achieved.

Here, as described above, a metal oxide particle in an alkaline aqueous solution undergoes substitution with hydroxy groups (—OH) at its surface, which increases the absolute value of the zeta potential and improves its dispersibility. Hence, from the viewpoint of dispersibility, it is preferable to increase the hydrogen ion exponent of the photocatalyst dispersion element (solvent). However, if the hydrogen ion exponent of the photocatalyst dispersion element (solvent) is too high, the catalytic activity of the photocatalyst may decrease as described above. On the other hand, as described above, even if the hydrogen ion exponent of the photocatalyst dispersion element (solvent) is low, the catalytic activity of the photocatalyst does not decrease. Thus, the upper limit of the hydrogen ion exponent can be determined from the viewpoint of suppressing the decrease of the catalytic activity of the formed photocatalyst, and the lower limit of the hydrogen ion exponent can be also determined from the viewpoint of dispersibility. This can increase the catalytic activity of the formed photocatalyst, as well as suppressing the aggregation of the photocatalytic material and improving uniformity of dispersion.

In accordance with the findings obtained by the inventors, it was found that for instance, in the case where the added amount of tungsten oxide is 2.5 wt %, the dispersibility is deteriorated when the hydrogen ion exponent of the photocatalyst dispersion element (solvent) is less than pH 2.1. In this case, aggregation of tungsten oxide particles was also confirmed. Thus, it is preferable that the hydrogen ion exponent of the photocatalyst dispersion element (solvent) is pH 2.1 or more.

Furthermore, a buffer can also be added to maintain the hydrogen ion exponent of the photocatalyst dispersion element (solvent). The buffer can illustratively be an aqueous solution of a weak acid and its salt added thereto. Examples of the buffer include a citric acid buffer, which is illustratively an aqueous solution of citric acid and sodium citrate added thereto, an acetic acid buffer, which is illustratively an aqueous solution of acetic acid and sodium acetate added thereto, and a phosphoric acid buffer, which is illustratively an aqueous solution of phosphoric acid and sodium phosphate added thereto. However, in the case of adding a buffer, it is preferable that the hydrogen ion exponent of the photocatalyst dispersion element (solvent) after the addition is in the aforementioned range.

The foregoing has described the effect that the hydrogen ion exponent of the photocatalyst dispersion element (solvent) exerts on the catalytic activity of the photocatalyst formed by adhering the photocatalyst dispersion to the surface of the substrate.

Next, an illustration is given of the effect that the constituent concentration of the ion additive contained in the photocatalyst dispersion element exerts on the catalytic activity of the photocatalyst formed by adhering the photocatalyst dispersion element to the surface of the substrate.

Figure 4:
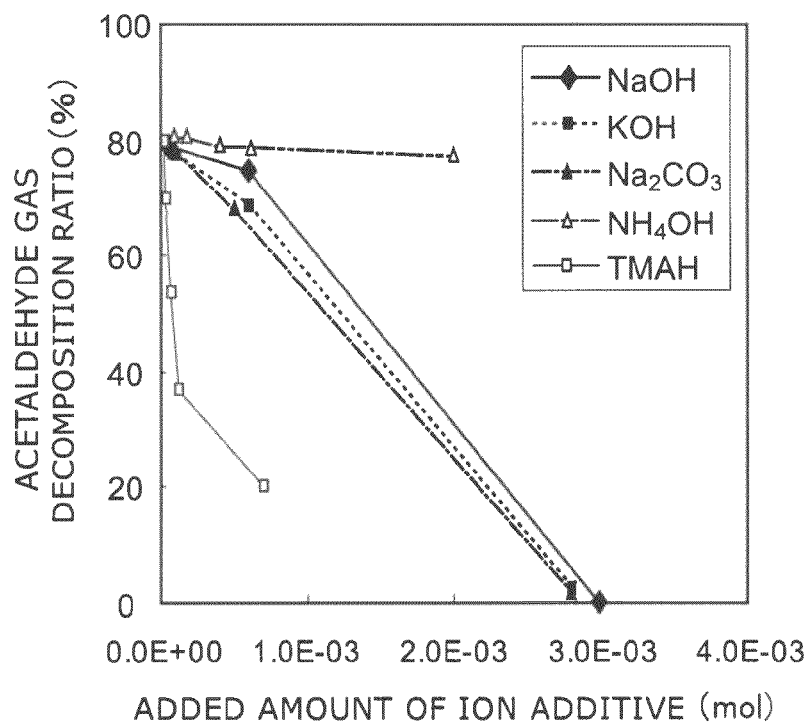
FIG. 4 is a graph for illustrating the decomposition characteristics of acetaldehyde gas.

FIG. 4 is a graph for illustrating the decomposition characteristics of acetaldehyde gas.

Figure 5:
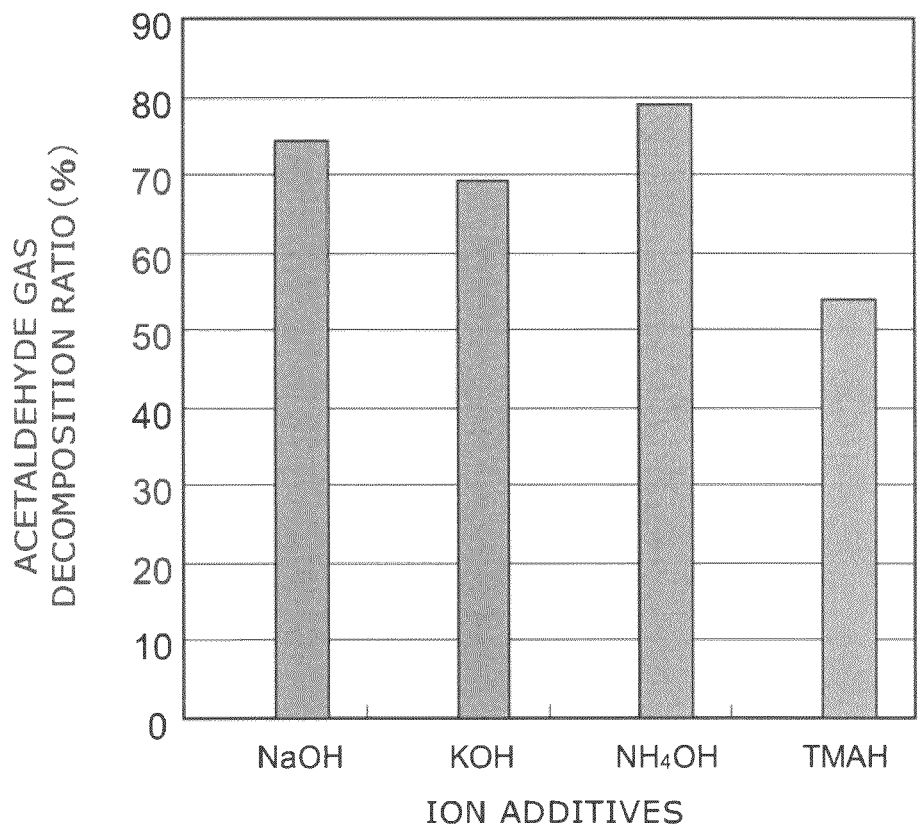
FIG. 5 is a graph for illustrating the decomposition characteristics of acetaldehyde gas for the case of adding 1 mol of the ion additive.

FIG. 5 is a graph for illustrating the decomposition characteristics of acetaldehyde gas for the case of adding 1 mol of the ion additive.

Here, FIGS. 4 and 5 are graphs for illustrating the characteristics for the case where the photocatalyst dispersion element is adhered to a substrate surface and dried to form a photocatalyst, which is irradiated with visible light to decompose acetaldehyde gas.

In this case, the flowable substance as a solvent is water, and the photocatalytic material is tungsten oxide ($WO_3$). The added amount of tungsten oxide ($WO_3$) is 10 wt %. Here, the added mole amount is the amount for 20 gw of an aqueous solution in which tungsten oxide ($WO_3$) is dispersed at 10 wt %. That is, it is the added mole amount in generally 20 ml of the aqueous solution.

As an ion additive, sodium hydroxide (NaOH), potassium hydroxide (KOH), sodium carbonate ($Na_2CO_3$), ammonium hydroxide ($NH_4OH$), and tetramethylammonium hydroxide (TMAH) are used.

The vertical axis of FIG. 4 represents acetaldehyde gas decomposition ratio (%), and the horizontal axis represents the added amount of the ion additive. The vertical axis of FIG. 5 represents acetaldehyde gas decomposition ratio (%), and the horizontal axis represents ion additives.

As shown in FIGS. 4 and 5, if tetramethylammonium hydroxide (TMAH), which is an organic alkali, is used as an ion additive, the acetaldehyde gas decomposition ratio significantly decreases even for a slight difference in the added amount. That is, variation in the constituent concentration of the ion additive contained in the photocatalyst dispersion element greatly affects the acetaldehyde gas decomposition ratio. Thus, the catalytic activity of the formed photocatalyst may become unstable.

On the other hand, an inorganic alkali such as sodium hydroxide (NaOH) can relax the effect that variation in the added amount, that is, variation in the constituent concentration of the ion additive contained in the photocatalyst dispersion element (solvent), exerts on the acetaldehyde gas decomposition ratio. Thus, the catalytic activity of the formed photocatalyst can be stabilized. In particular, when ammonium hydroxide ($NH_4OH$) is used as an ion additive, the effect of variation in the added amount (variation in the constituent concentration) exerted on the acetaldehyde gas decomposition ratio can be significantly decreased.

Here, as shown in FIG. 4, even in the case of using an inorganic alkali such as sodium hydroxide (NaOH), the catalytic activity of the formed photocatalyst decreases when the added amount is too large.

Thus, even in the case of using an ion additive composed primarily of an inorganic alkali such as sodium hydroxide (NaOH), it is preferable that the content of the ion additive is $1.5 \times 10^{-3}$ mol or less. Then, an acetaldehyde gas decomposition ratio of approximately 50% or more can be achieved. However, in the case of using an ion additive composed primarily of ammonium hydroxide ($NH_4OH$), a high acetaldehyde gas decomposition ratio can be maintained even if the added amount is approximately $2.0 \times 10^{-3}$ mol.

Next, other findings obtained by the inventors with regard to the photocatalyst dispersion element are illustrated.

In accordance with the findings obtained by the inventors, the dispersibility of the photocatalytic material may be deteriorated when the amount of the photocatalytic material contained in the photocatalyst dispersion element (solvent) exceeds 20 wt %. Hence, it is preferable that the content of the photocatalytic material is 20 wt % or less.

Furthermore, a dispersant can also be added to improve the dispersibility of the photocatalytic material. In this case, it is preferable to use an inorganic material, because an organic material used as a dispersant may be decomposed or degraded by the action of the photocatalyst. Here, in the case of adding a dispersant, it is preferable that the hydrogen ion exponent of the photocatalyst dispersion element (solvent) after the addition is in the aforementioned range.

Furthermore, when the photocatalyst dispersion element is adhered to the surface of a substrate or the like, it is preferable that the hardness of the photocatalyst formed after drying is high to some extent. Here, if there are many hydroxy groups (—OH) at the surface of tungsten oxide, tungsten oxide particles can be robustly coupled to each other through the oxygen group (—O—) when dried. However, if the hydrogen ion exponent is made excessively high to increase hydroxy groups (—OH), the catalytic activity may decrease as described above.

In this case, if a coupling agent having many hydroxy groups (—OH) at the surface is further added as a so-called binder, tungsten oxide particles can be coupled to each other through the coupling agent when the flowable substance used as a solvent is dried. Thus, the hardness of the formed photocatalyst can be increased by adding a coupling agent having many hydroxy groups (—OH) at the surface. Such a coupling agent is preferably not decomposed or degraded by the action of the photocatalyst. Such a coupling agent can illustratively be a dispersion of inorganic particles in a solution, such as colloidal silica and colloidal alumina.

Furthermore, if the inorganic material contained in the coupling agent, such as silicon oxide and alumina, has a larger particle diameter than the photocatalytic material, the hardness of the formed photocatalyst decreases. Hence, it is preferable that the particle diameter of the coupling agent is comparable to or smaller than the particle diameter of the photocatalytic material. That is, it is preferable that the size of the particle diameter of the binder used as a coupling agent is comparable to or smaller than the particle diameter of the photocatalytic material (such as tungsten oxide ($WO_3$)).

Furthermore, as the particle diameter of the inorganic material is made smaller, the transparency of the formed photocatalyst can be increased. If the transparency can be increased, not only the photocatalytic material provided at the surface of the photocatalyst but also the photocatalytic material provided inside the photocatalyst can be irradiated with light, and the catalytic efficiency can be increased.

Furthermore, it is preferable that the weight of the coupling agent contained in the photocatalyst dispersion element (solvent) is 1/10 or more of the weight of the photocatalytic material.

Furthermore, the viscosity of the photocatalyst dispersion element can be adjusted by varying the amount of the coupling agent and the size of the particle diameter of the inorganic material contained in the coupling agent. Thus, as described later, the viscosity of the photocatalyst dispersion element can be suitably determined in accordance with the type and the like of the photocatalyst body.

Here, in the case of adding a coupling agent, it is preferable that the hydrogen ion exponent of the photocatalyst dispersion element (solvent) after the addition is in the aforementioned range.

Furthermore, the flowable substance as a solvent can be one evaporated at room temperature (such as water). This can improve workability in forming a photocatalyst on the surface of a substrate by using a photocatalyst dispersion element as described later.

Next, a method for producing a photocatalyst dispersion element according to this embodiment is illustrated.

In producing the photocatalyst dispersion element, the hydrogen ion exponent of the flowable substance as a solvent is adjusted so as to fall in the range in which the decrease of the catalytic activity of the photocatalyst can be suppressed. Here, it is preferable to adjust the hydrogen ion exponent of the flowable substance so as to fall in the range in which aggregation of the photocatalytic material in the flowable substance (in the solvent) can be suppressed.

Furthermore, it is preferable that the ion additive used to adjust the hydrogen ion exponent is composed primarily of one generating cations having a smaller ion radius than at least the tetramethylammonium ion ($TMA^+$). In this case, it can illustratively be an ion additive composed primarily of an inorganic alkali. The inorganic alkali can illustratively be one capable of generating alkali metal ions, alkaline earth metal ions, and ammonium ions. For instance, the ion additive can be composed primarily of sodium hydroxide (NaOH), potassium hydroxide (KOH), sodium carbonate ($Na_2CO_3$), or ammonium hydroxide ($NH_4OH$) described above.

Furthermore, in the case of using an ion additive, it is preferable that the constituent concentration of the ion additive falls in the range in which the decrease of the catalytic activity of the formed photocatalyst can be suppressed.

Furthermore, a buffer can also be added to maintain the hydrogen ion exponent of the flowable substance (solvent) whose hydrogen ion exponent is adjusted. Furthermore, a dispersant can also be added to improve the dispersibility of the photocatalytic material. Furthermore, a coupling agent having many hydroxy groups (—OH) at the surface can also be added. Furthermore, the viscosity of the photocatalyst dispersion element can be adjusted by varying the amount of the coupling agent and the size of the particle diameter of the inorganic material contained in the coupling agent.

In the case of adding a buffer, dispersant, coupling agent and the like, it is preferable that the hydrogen ion exponent of the flowable substance (solvent) after the addition is in the aforementioned range.

The range of hydrogen ion exponent in which the decrease of the catalytic activity of the formed photocatalyst can be suppressed, the range of hydrogen ion exponent in which aggregation of the photocatalytic material in the flowable substance (in the solvent) can be suppressed, and the range of the constituent concentration of the ion additive in which the decrease of the catalytic activity of the formed photocatalyst can be suppressed are similar to those described above, and hence the description thereof is omitted.

Furthermore, the flowable substance as a solvent is preferably one evaporated at room temperature, and can illustratively be water.

Thus, a photocatalyst dispersion element is produced by mixing a photocatalytic material in a flowable substance (solvent) with the hydrogen ion exponent and the like adjusted.

Although the foregoing has illustrated the case of mixing a photocatalytic material after adjusting the hydrogen ion exponent and the like of the flowable substance (solvent), it is also possible to mix a photocatalytic material in a flowable substance (solvent) before adjusting the hydrogen ion exponent and the like, and adjust the hydrogen ion exponent and the like of the flowable substance (solvent) mixed with the photocatalytic material. That is, it is only necessary to include the process of adjusting the hydrogen ion exponent of the flowable substance (solvent) so as to fall in the range in which the decrease of the catalytic activity of the formed photocatalyst can be suppressed, and the process of mixing the photocatalytic material in the flowable substance (solvent).

Next, a photocatalyst body and a method for producing a photocatalyst body according to this embodiment are illustrated.

Figure 6:
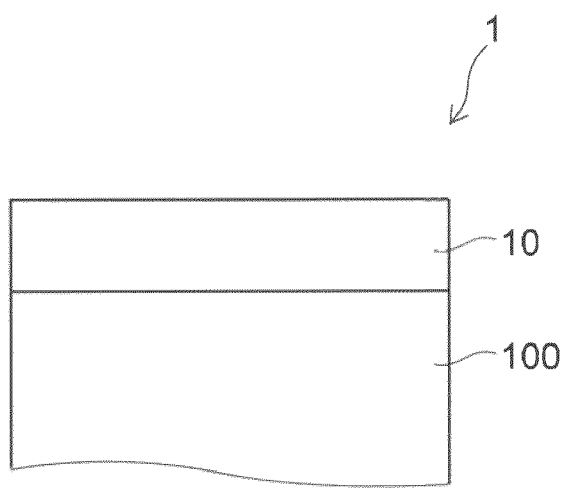
FIG. 6 is a schematic view for illustrating the cross-sectional structure of the photocatalyst body according to this embodiment.

FIG. 6 is a schematic view for illustrating the cross-sectional structure of the photocatalyst body according to this embodiment.

As shown in FIG. 6, the photocatalyst body 1 includes a photocatalyst 10 formed like a film on the surface of a substrate 100. The material of the substrate 100 is not particularly limited, but various materials can be used, including inorganic materials such as glass and ceramic, metal materials such as stainless steel, or organic materials such as polymer materials. Furthermore, the shape and size thereof can be suitably determined. Here, if the substrate 100 is made of a polymer or other organic material, the substrate 100 may be decomposed or degraded by the action of the photocatalyst. Hence, in the case of using a substrate 100 made of an organic material, it is preferable to provide an intermediate layer, not shown, between the photocatalyst 10 and the substrate 100. The intermediate layer can illustratively be a silicone resin layer, an acrylic modified silicone resin layer, or an organic-inorganic composite graded layer.

The photocatalyst 10 can be formed by adhering the aforementioned photocatalyst dispersion element to the surface of the substrate 100 and drying it. By using the aforementioned photocatalyst dispersion element, the photocatalyst 10 can contain a metal oxide and include couplings between the metallic element and the hydroxy group. In the case of containing tungsten oxide ($WO_3$), the photocatalyst 10 can include couplings between tungsten (W) and the hydroxy group (—OH). More specifically, in the case of containing tungsten oxide, the photocatalyst 10 can have an absorption peak in the range of 3500-3800 $cm^{-1}$ in Fourier transform infrared (FT-IR) spectroscopic measurement.

The adhering method is not particularly limited, but can illustratively be the dip coating method, spin coating method, spray coating method, bar coating method, knife coating method, roll coating method, blade coating method, die coating method, or gravure coating method. Furthermore, as described above, workability of the adhering operation can be improved by suitably selecting the viscosity of the photocatalyst dispersion element. For instance, in a place susceptible to disturbances such as wind and on a vertical surface, it is preferable to use a photocatalyst dispersion element with high viscosity. This can suppress dripping and the like, and hence improve workability. On the other hand, use of a photocatalyst dispersion element with low viscosity can improve uniformity in the thickness of the photocatalyst 10.

Furthermore, the method for drying the adhered photocatalyst dispersion element is also not particularly limited, but can illustratively be natural drying (room-temperature drying) or drying by heating. The drying temperature can be adjusted by suitably selecting the flowable substance serving as a solvent or by adding an additive. In this case, if the flowable substance as a solvent is one evaporated at room temperature (such as water), workability can be improved.

The application of the photocatalyst body 1 is not particularly limited, but it can be widely used in various parts and products.

For instance, the photocatalyst dispersion element can be adhered to the surface of an indoor or outdoor building material and the like and dried to form the photocatalyst 10 on the surface thereof. If the photocatalyst 10 can be formed on the surface of the indoor or outdoor building material and the like, solar light and indoor light can be used to decompose and remove hazardous and odor substances in the atmosphere, and to achieve antifouling, sterilizing, antifungal and other superior functions.

In this case, if tungsten oxide is used as the photocatalytic material, the action of the photocatalytic material can be achieved also indoors, where there is little ultraviolet radiation. Thus, even indoors, hazardous substances such as acetaldehyde and formaldehyde can be decomposed and removed by using indoor light. This is also advantageous to addressing the sick building syndrome.

Applications of the photocatalyst body 1 illustratively include wall papers, curtains, carpets, ceiling materials, floor materials, window glasses, mirrors, tiles, sanitary products, furniture, lighting fixtures, filter parts for air conditioners and deodorizing equipment, home electric appliances, packaging materials, and information recording media.

The photocatalyst body 1 is also applicable to parts constituting the outer surface of a building, such as building materials (e.g., gypsum boards, cemented plates, concrete plates, and wood-fiber plates) constituting the wall surface of a building.

Furthermore, the photocatalyst body 1 is also applicable to the inner and outer wall surface of transportation machines such as automobiles, trains, airplanes, and ships, and to packaging containers for foods and the like.

The embodiments of the invention have been illustrated. However, the invention is not limited to the foregoing description.

Those skilled in the art can suitably modify the above embodiments, and such modifications are also encompassed within the scope of the invention as long as they fall within the spirit of the invention.

Furthermore, the components of the above embodiments can be combined with each other as long as technically feasible, and such combinations are also encompassed within the scope of the invention as long as they fall within the spirit of the invention.

The invention claimed is:

1. A photocatalyst dispersion element comprising:
   a photocatalytic material;
   a solvent; and
   an ion additive,
   the ion additive generating a cation having a smaller ion radius than a tetramethylammonium ion in the solvent,
   wherein hydrogen ion exponent is set to pH 7.5 or less by containing the ion additive,
   wherein a content of the ion additive is $1.5 \times 10^{-3}$ mol or less.

2. The element according to claim 1, wherein the ion additive generates at least one selected from the group consisting of an alkali metal ion, an alkaline earth metal ion, and an ammonium ion.

3. The element according to claim 1, wherein the ion additive includes at least one selected from the group consisting of sodium hydroxide, potassium hydroxide, sodium carbonate, and ammonium hydroxide.

4. The element according to claim 1, wherein a content of the photocatalytic material is 20 wt % or less.

5. The element according to claim 1, wherein the photocatalytic material is tungsten oxide.

6. The element according to claim 1, further comprising:
   a coupling agent configured to couple particles of the photocatalytic material when the solvent is dried.

7. The element according to claim 6, wherein a content of the coupling agent is one tenth or more of a content of the photocatalytic material.

8. The element according to claim 6, wherein a particle diameter of the coupling agent is comparable to or smaller than a particle diameter of the photocatalytic material.

9. The element according to claim 1, wherein the solvent is evaporated at room temperature.

10. A method for producing a photocatalyst dispersion element, comprising:
adjusting hydrogen ion exponent of a solvent so as to fall in a range of suppressing decrease of catalytic activity of a photocatalyst to be formed; and
mixing a photocatalytic material in the solvent,
wherein the hydrogen ion exponent of the solvent is adjusted so as to fall in a range of pH 7.5 or less,
wherein the hydrogen ion exponent of the solvent is adjusted by using an ion additive generating a cation having a smaller ion radius than a tetramethylammonium ion in the solvent, and a content of the ion additive is set to $1.5 \times 10^{-3}$ mol or less.

11. The method according to claim 10, wherein the photocatalytic material is tungsten oxide.

12. A photocatalyst body comprising:
a substrate; and
a photocatalyst formed by adhering a photocatalyst dispersion element to a surface of the substrate and drying the photocatalyst dispersion element,
the photocatalyst dispersion element including:
a photocatalytic material;
a solvent; and
an ion additive,
the ion additive generating a cation having a smaller ion radius than a tetramethylammonium ion in the solvent,
wherein hydrogen ion exponent is set to pH 7.5 or less by containing the ion additive,
wherein a content of the ion additive is $1.5 \times 10^{-3}$ mol or less.

13. The body according to claim 12, wherein the photocatalyst contains a metal oxide and includes a coupling between a metallic element and a hydroxy group.

14. The body according to claim 12, wherein the photocatalyst has an absorption peak in a range of 3500-3800 cm−1 in Fourier transform infrared spectroscopic measurement.

15. The body according to claim 12, wherein the photocatalyst contains tungsten oxide.

16. A method for producing a photocatalyst body, comprising:
adhering a photocatalyst dispersion element to a surface of a substrate,
the photocatalyst dispersion element including:
a photocatalytic material;
a solvent; and
an ion additive,
the ion additive generating a cation having a smaller ion radius than a tetramethylammonium ion in the solvent,
wherein hydrogen ion exponent is set to pH 7.5 or less by containing the ion additive,
wherein a content of the ion additive is $1.5 \times 10^{-3}$ mol or less.

* * * * *